United States Patent
Hu et al.

(10) Patent No.: US 8,301,385 B2
(45) Date of Patent: Oct. 30, 2012

(54) SHOT GATHER DATA BEAMER AND DEBEAMER

(75) Inventors: Chaoshun Hu, San Ramon, CA (US); Yue Wang, Danville, CA (US); Tamas Nemeth, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 325 days.

(21) Appl. No.: 12/826,176

(22) Filed: Jun. 29, 2010

(65) Prior Publication Data

US 2011/0320129 A1 Dec. 29, 2011

(51) Int. Cl.
*G01V 1/28* (2006.01)

(52) U.S. Cl. .............. 702/14; 702/16; 702/17; 702/181; 703/2; 367/38; 367/53

(58) Field of Classification Search ..................... 702/14, 702/16, 17, 181; 703/2; 367/25, 35, 38, 367/53, 149, 73, 57
See application file for complete search history.

(56) References Cited

U.S. PATENT DOCUMENTS

| | | | |
|---|---|---|---|
| 4,905,204 A | 2/1990 | Hughes | |
| 5,265,192 A * | 11/1993 | McCormack | 706/20 |
| 5,274,605 A * | 12/1993 | Hill | 367/53 |
| 6,738,715 B2 * | 5/2004 | Shatilo et al. | 702/17 |
| 6,904,368 B2 * | 6/2005 | Reshef et al. | 702/17 |
| 7,328,108 B2 * | 2/2008 | Robertsson et al. | 702/17 |
| 7,355,923 B2 * | 4/2008 | Reshef et al. | 367/53 |
| 7,952,960 B2 * | 5/2011 | Brandsberg-Dahl et al. | 367/38 |
| 7,961,551 B2 * | 6/2011 | Robertsson et al. | 367/149 |
| 8,060,312 B2 * | 11/2011 | Wang et al. | 702/14 |
| 8,095,345 B2 * | 1/2012 | Hoversten | 703/2 |
| 8,219,321 B2 * | 7/2012 | Wang et al. | 702/14 |
| 2004/0049348 A1 * | 3/2004 | Wood | 702/17 |
| 2004/0243312 A1 * | 12/2004 | Schonewille | 702/14 |
| 2008/0130411 A1 * | 6/2008 | Brandsberg-Dahl et al. | 367/57 |
| 2008/0221801 A1 * | 9/2008 | Craft et al. | 702/17 |
| 2009/0240438 A1 * | 9/2009 | Wang et al. | 702/14 |
| 2010/0185422 A1 * | 7/2010 | Hoversten | 703/2 |
| 2011/0103187 A1 * | 5/2011 | Albertin et al. | 367/73 |
| 2011/0286305 A1 * | 11/2011 | Artman et al. | 367/38 |
| 2012/0004850 A1 * | 1/2012 | Wang et al. | 702/14 |
| 2012/0014214 A1 * | 1/2012 | Artman et al. | 367/25 |
| 2012/0075954 A1 * | 3/2012 | Xu et al. | 367/38 |
| 2012/0140593 A1 * | 6/2012 | Stoffa et al. | 367/38 |

* cited by examiner

*Primary Examiner* — Carol Tsai
(74) *Attorney, Agent, or Firm* — Marie L. Clapp

(57) ABSTRACT

Beamed data can be obtained from shot gather data, and debeamed data can be obtained from beamed data. Shot gather data for a geophysical volume of interest in a first domain and/or beamed data in a third domain may be received. The first domain has a component relating to seismic wave propagation time and a spatial component relating to lateral spacing. The third domain has a component relating to local plane wave arrival time at a beam center surface location and a component relating to plane wave arrival directions. Data may be transformed between the first domain and a second domain. The second domain has a frequency component and a spatial component corresponding to the spatial component of the first domain. A forward or reverse transform may be applied to transform shot gather data in the first domain to/from beamed data in the third domain.

20 Claims, 7 Drawing Sheets

SHOT GATHER DATA BEAMER AND DEBEAMER

FIELD OF THE INVENTION

The invention relates to obtaining beamed data from shot gather data, and obtaining debeamed data associated with shot gather data from beamed data.

BACKGROUND OF THE INVENTION

Seismic beamers and debeamers are known. However, existing seismic beamers and debeamers are based on common offset domain. Additionally, distribution of input traces is regular in existing seismic beamers and debeamers. Current multi-dimensional, multi-azimuth surveys, however, typically have several tens of thousands of multi-dimensional shots, and distribution of receiver traces is generally irregular. As such, existing seismic beamers and debeamers based on common offset domain suffer from azimuth limitation.

SUMMARY

One aspect of the invention relates to computer-implemented method for obtaining beamed data from shot gather data. The method may include receiving shot gather data for a geophysical volume of interest in a first domain. The first domain has at least a first component and a second component, wherein the first component relates to seismic wave propagation time within the geophysical volume of interest and the second component relates to lateral spacing in the geophysical volume of interest. The method may include transforming the received shot gather data from the first domain to a second domain. The second domain has a frequency component and at least one spatial component, wherein the at least one spatial component corresponds to the second component of the first domain. The method may include weighting the shot gather data in the second domain using a weighting function. The method may include transforming the weighted shot gather data from the second domain to the first domain. The method may include applying a forward transform to the weighted shot gather data in the first domain to obtain beamed data in a third domain. The third domain has at least a first component and a second component, wherein the first component relates to local plane wave arrival time at a beam center surface location of the geophysical volume of interest and the second component relates to plane wave arrival directions.

Another aspect of the invention relates to a computer-implemented method for obtaining debeamed data from beamed data. The method may include receiving beamed data in a third domain. The third domain has at least a first component and a second component, wherein the first component relates to local plane wave arrival time at a beam center surface location of the geophysical volume of interest and the second component relates to plane wave arrival directions. The method may include applying a reverse transform to the received beamed data in the third domain to obtain weighted debeamed data in a first domain. The first domain has at least a first component and a second component, wherein the first component relates to seismic wave propagation time within the geophysical volume of interest and the second component relates to lateral spacing in the geophysical volume of interest. The method may include transforming the weighted debeamed data from the first domain to a second domain. The second domain has a frequency component and at least one spatial component, wherein the at least one spatial component corresponds to the second component of the first domain. The method may include deweighting the weighted debeamed data in the second domain using a weighting function to obtain deweighted debeamed data. The method may include obtaining debeamed data in the first domain based on the deweighted debeamed data. The debeamed data may be associated with shot gather data.

Yet another aspect of the invention relates to a system configured to obtain beamed data from shot gather data and debeamed data from beamed data. The system may include one or more processors configured to execute computer program modules. The computer program modules may include one or more of a communications module, a time-frequency transform module, a weighting-deweighting module, or a forward-reverse transform module. The communications module may be configured to receive data including one or more of shot gather data for a geophysical volume of interest in a first domain or beamed data in a third domain. The first domain has at least a first component and a second component, wherein the first component relates to seismic wave propagation time within the geophysical volume of interest and the second component relates to lateral spacing in the geophysical volume of interest. The third domain has at least a first component and a second component, wherein the first component relates to local plane wave arrival time at a beam center surface location of the geophysical volume of interest and the second component relates to plane wave arrival directions. The time-frequency transform module may be configured to transform data between the first domain and a second domain. The second domain has a frequency component and at least one spatial component, wherein the at least one spatial component corresponds to the second component of the first domain. The weighting-deweighting module may be configured to perform one or more of weighting data using a weighting function or deweighting data using the weighting function. The forward-reverse transform module may be configured to perform one or more of applying a forward transform to weighted shot gather data in the first domain to obtain beamed data in the third domain or applying a reverse transform to beamed data in the third domain to obtain weighted debeamed data in the first domain.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
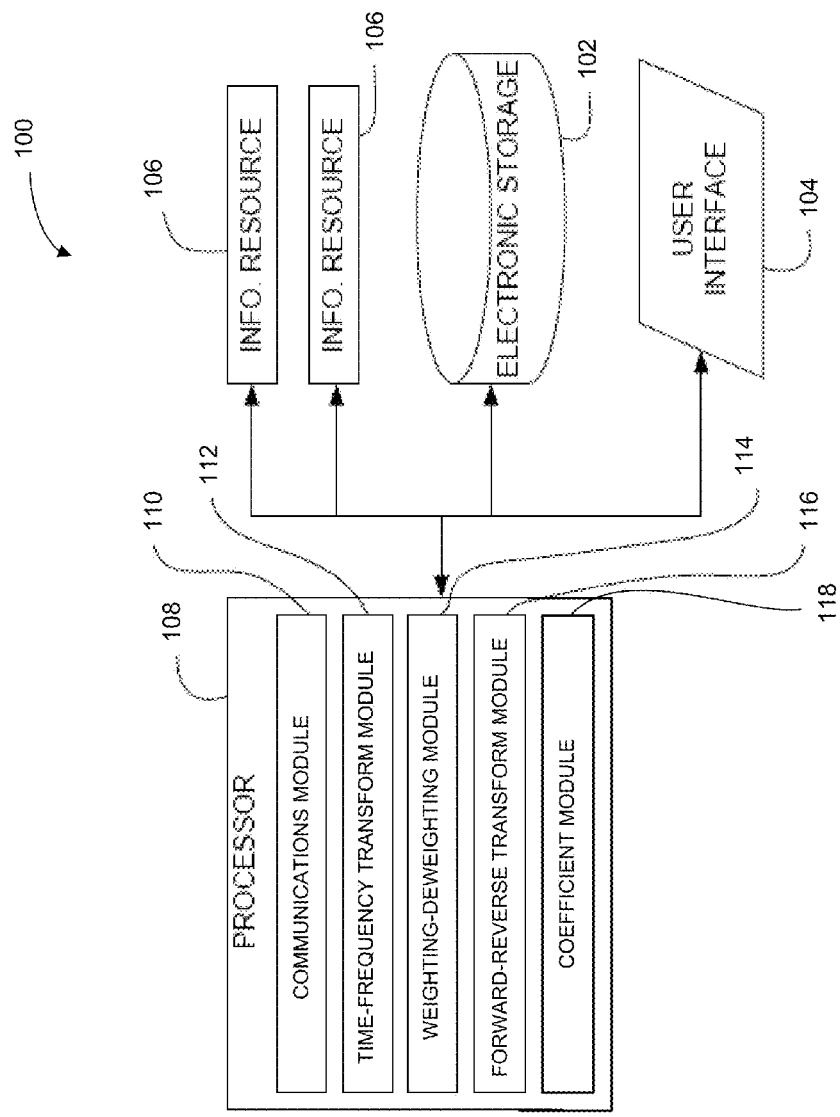
FIG. 1 illustrates a system configured to obtain beamed data from shot gather data and debeamed data from beamed data, in accordance with one or more embodiments of the invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processer computer processors system, hand-held devices, programmable consumer electronics, mini-computers, mainframe computers, and the like. The invention may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1 illustrates a system 100 configured to obtain beamed data from shot gather data and debeamed data from beamed data, in accordance with one or more embodiments of the invention. Exemplary embodiments include multi-dimensional shot gather data beamer and debeamer systems and methods based on plane wave decomposition for point sources using local Tau-Px-Py transforms. Exemplary embodiments may provide local beamed data and interface functions for shot domain seismic applications. The local beamed data facilitate other applications including beam domain velocity analysis, noise attenuation, coherency enhancement, extraction, and/or other applications. In one embodiment, the system 100 includes electronic storage 102, a user interface 104, one or more information resources 106, one or more processors 108, and/or other components.

In one embodiment, the electronic storage 102 includes electronic storage media that electronically stores information. The electronic storage media of the electronic storage 102 may include system storage that is provided integrally (i.e., substantially non-removable) with the system 100 and/or removable storage that is removably connectable to the system 100 via, for example, a port (e.g., a USB port, a firewire port, etc.) or a drive (e.g., a disk drive, etc.). The electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 102 may store software algorithms, information determined by the processor 108, information received via the user interface 104, information received from the information resources 106, and/or other information that enables the system 100 to function as described herein. The electronic storage 102 may be a separate component within the system 100, or the electronic storage 102 may be provided integrally with one or more other components of the system 100 (e.g., the processor 108).

The user interface 104 is configured to provide an interface between the system 100 and a user through which the user may provide information to and receive information from the system 100. This enables data, results, and/or instructions and any other communicable items, collectively referred to as "information," to be communicated between the user and the system 100. As used herein, the term "user" may refer to a single individual or a group of individuals who may be working in coordination. Examples of interface devices suitable for inclusion in the user interface 104 include one or more of a keypad, buttons, switches, a keyboard, knobs, levers, a display screen, a touch screen, speakers, a microphone, an indicator light, an audible alarm, and/or a printer. In one embodiment, the user interface 104 actually includes a plurality of separate interfaces.

It is to be understood that other communication techniques, either hard-wired or wireless, are also contemplated by the present invention as the user interface 104. For example, the present invention contemplates that the user interface 104 may be integrated with a removable storage interface provided by the electronic storage 102. In this example, information may be loaded into the system 100 from removable storage (e.g., a smart card, a flash drive, a removable disk, etc.) that enables the user to customize the implementation of the system 100. Other exemplary input devices and techniques adapted for use with the system 100 as the user interface 104 include, but are not limited to, an RS-232 port, RF link, an IR link, modem (telephone, cable or other). In short, any technique for communicating information with the system 100 is contemplated by the present invention as the user interface 104.

The information resources 106 include one or more sources of information related to the geophysical volume of interest including shot gather data and/or other information utilized in obtaining beamed and debeamed data. By way of non-limiting example, one of information resources 106 may include seismic data acquired at or near the geological volume of interest, information derived therefrom, and/or information related to the acquisition. Such seismic data may include source wavefields and receiver wavefields. The seismic data may include individual traces of seismic data, or the data recorded at on one channel of seismic energy propagating through the geological volume of interest from a source. The information derived from the seismic data may include, for example, a velocity model, beam properties associated with beams used to model the propagation of seismic energy through the geological volume of interest, Green's functions associated with beams used to model the propagation of seismic energy through the geological volume of interest, and/or other information. Information related to the acquisition of seismic data may include, for example, data related to the position and/or orientation of a source of seismic energy, the positions and/or orientations of one or more detectors of seismic energy, the time at which energy was generated by the source and directed into the geological volume of interest, and/or other information.

The processor 108 is configured to provide information processing capabilities in the system 100. As such, the processor 108 may include one or more of a digital processor, an analog processor, a digital circuit designed to process information, an analog circuit designed to process information, a state machine, and/or other mechanisms for electronically processing information. Although the processor 108 is shown in FIG. 1 as a single entity, this is for illustrative purposes only. In some implementations, the processor 108 may include a plurality of processing units. These processing units may be physically located within the same device or computing platform, or the processor 108 may represent processing functionality of a plurality of devices operating in coordination.

As is shown in FIG. 1, the processor 108 may be configured to execute one or more computer program modules. The one or more computer program modules may include one or more of a communications module 110, a time-frequency transform module 112, a weighting-deweighting module 114, a forward-reverse transform module 116, a coefficient module 118, and/or other modules. The processor 108 may be configured to execute modules 110, 112, 114, 116, and/or 118 by software; hardware; firmware; some combination of software, hardware, and/or firmware; and/or other mechanisms for configuring processing capabilities on the processor 108.

It should be appreciated that although the modules 110, 112, 114, 116, and 118 are illustrated in FIG. 1 as being co-located within a single processing unit, in implementations in which the processor 108 includes multiple processing units, one or more of the modules 110, 112, 114, 116, and/or 118 may be located remotely from the other modules. The description of the functionality provided by the different modules 110, 112, 114, 116, and/or 118 described below is for illustrative purposes, and is not intended to be limiting, as any of the modules 110, 112, 114, 116, and/or 118 may provide more or less functionality than is described. For example, one or more of the modules 110, 112, 114, 116, and/or 118 may be eliminated, and some or all of its functionality may be provided by other ones of the modules 110, 112, 114, 116, and/or 118. As another example, the processor 108 may be configured to execute one or more additional modules that may perform some or all of the functionality attributed below to one of the modules 110, 112, 114, 116, and/or 118.

The communications module 110 may be configured to receive data. Such data may be received from the information resources 106, the user via the user interface 104, the electronic storage 102, and/or other data sources. The received data may include shot gather data for a geophysical volume of interest. Such shot gather data may be in a first domain. The first domain may include a component relating to seismic wave propagation time within the geophysical volume of interest. For clarity and brevity, this component is referred to herein as the first component of the first domain. The first domain may also include one or more components relating to lateral spacing in the geophysical volume of interest. One of these components is referred to herein as the second component of the first domain. The one or more components relating to lateral spacing may be associated with one or more detector positions. In one embodiment, the first domain may be referred to as the (t, x, y)-domain, where t represents seismic wave propagation time, and x and y represent lateral spacing.

The data received by the communications module 110 may include beamed data. Such beamed data may be in a third domain. The third domain may include a component relating to local plane wave arrival time at a beam center surface location of the geophysical volume of interest. For clarity and brevity, this component is referred to herein as the first component of the third domain. The third domain may also include one or more components relating to plane wave arrival directions. One of these components in referred to herein as the second component of the third domain. In one embodiment, the third domain may be referred to as the (Tau, Px, Py)-domain, where Tau represents local plane wave arrival time, and Px and Py represent plane wave arrival directions.

According to some embodiments, data received by the communications module 110 may be binned prior to receipt be the communications module 110. In some embodiments the communications module 110 may be configured to bin data received by the communications module 110. By way of non-limiting example, received shot gather data may be binned in one or more components relating to lateral spacing of the first domain (e.g., the second component of the first domain). Such binning may be based on one or more beam center locations.

The time-frequency transform module 112 may be configured to transform data between the first domain and a second domain. The second domain has a frequency component and at least one spatial component. The at least one spatial component of the second domain corresponds to the second component of the first domain, in that they represent similar information. In one embodiment, the second domain may be referred to as the ($\omega$, x, y)-domain, where $\omega$ represents frequency, and x and y represent lateral spacing.

In some embodiments, the time-frequency transform module 112 may be configured to transform shot gather data and/or other data from the first domain to the second domain using a fast Fourier transform. The time-frequency transform module 112 may be configured to transform weighted shot gather data and/or other data from the second domain to the first domain using an inverse fast Fourier transform. It is noteworthy that other transforms and inverse transforms may be utilized by the time-frequency transform module 112 to transform data between the first domain and a second domain, according to various embodiments.

The weighting-deweighting module 114 may be configured to weight and/or deweight data using a weighting function. The weighting function may include or be related to a Gaussian function. The weighting function may be related to the square of a distance to one or more beam center locations. The weighting and/or deweighting performed by the weighting-deweighting module 114 may be performed based on individual ones of one or more beam center locations. Other weighting and/or deweighting techniques are contemplated, and may be performed by the weighting-deweighting module 114 in accordance with various embodiments.

The forward-reverse transform module 116 may be configured to apply a forward transform to weighted shot gather data in the first domain to obtain beamed data in the third domain. The forward-reverse transform module 116 may be configured to apply a reverse transform to beamed data in the third domain to obtain weighted debeamed data in the first domain. The forward transform and the reverse transform may be referred to collectively as Tau-Px-Py transforms. In exemplary embodiments, for forward or reverse Tau-Px-Py transforms, a time shift in the x-component or y-component is related to the product of horizontal slowness and horizontal distance between a particular trace and a beam center position.

The coefficient module 118 may be configured to store coefficients. Such coefficients may be stored in the electronic storage 102. The stored coefficients may be retrieved by the time-frequency transform module 112, the weighting-deweighting module 114, and/or other modules. According to exemplary embodiments, the stored coefficients may include weighting coefficients associated with the weighting function, coefficients associated with one or more transforms performed by the time-frequency transform module 112 and/or the weighting-deweighting module 114, and/or other coefficients.

Figure 2:
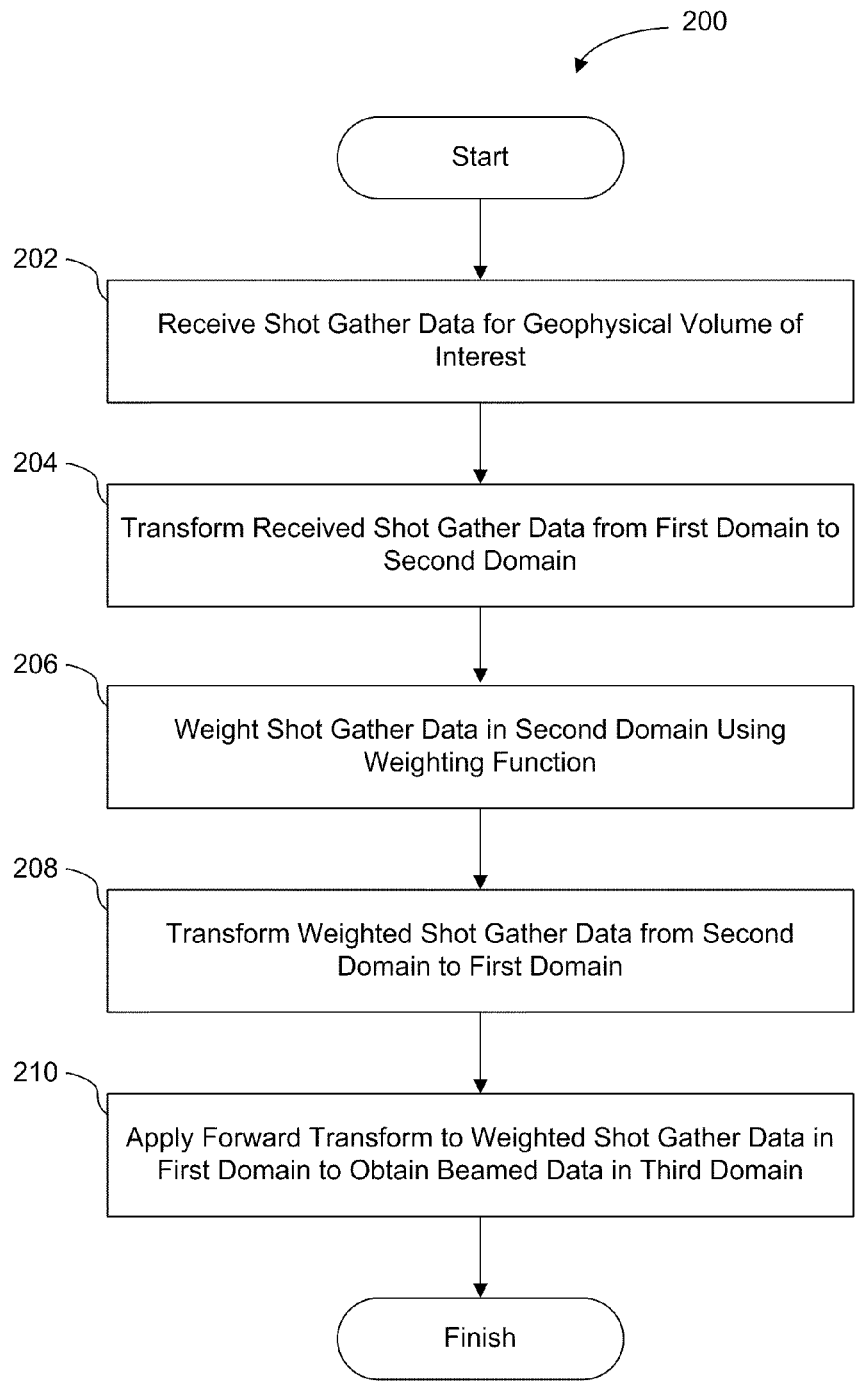
FIG. 2 illustrates a method for obtaining beamed data from shot gather data, in accordance with one or more embodiments of the invention.

FIG. 2 illustrates a method 200 for obtaining beamed data from shot gather data, in accordance with one or more embodiments of the invention. The operations of the method 200 presented below are intended to be illustrative. In some embodiments, the method 200 may be accomplished with one or more additional operations not described, and/or without one or more of the operations discussed. Additionally, the order in which the operations of the method 200 are illustrated in FIG. 2 and described below is not intended to be limiting.

In some embodiments, the method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 200 in response to instructions stored electronically on an electronic storage medium. The one or more processing devices may include one or more devices configured through hardware, firmware, and/or software to be specifically designed for execution of one or more of the operations of the method 200.

At an operation 202, shot gather data for a geophysical volume of interest is received. The received shot gather data may be in the first domain. One or more components of the first domain may be associated with one or more detector positions. The received shot gather data may be binned prior to the operation 202, or may be performed as part of the operation 202. By way of non-limiting example, received shot gather data may be binned in one or more components relating to lateral spacing of the first domain (e.g., the second component of the first domain). Such binning may be based on one or more beam center locations. According to exemplary embodiments, the communications module 110 may be executed to perform the operation 202.

At an operation 204, the received shot gather data is transformed from the first domain to the second domain. The received shot gather data may be transformed from the first domain to the second domain using a fast Fourier transform in some embodiments. The operation 204 may be performed through execution of the time-frequency transform module 112, in accordance with exemplary embodiments.

At an operation 206, the shot gather data in the second domain is weighted using a weighting function. The weighting function may include or be related to a Gaussian function. The weighting function may be related to the square of a distance to one or more beam center locations. The weighting performed at the operation 206 may be based on individual ones of one or more beam center locations. In some embodiments, the operation 206 is performed by executing the weighting-deweighting module 114. It is noteworthy that weighting coefficients associated with the weighting function may be stored by the coefficient module 118.

At an operation 208, the weighted shot gather data is transformed from the second domain to the first domain. In some embodiments, the weighted shot gather data may be transformed from the second domain to the first domain using an inverse fast Fourier transform. The time-frequency transform module 112 may be executed to perform the operation 208.

At an operation 210, a forward transform is applied to the weighted shot gather data in the first domain to obtain beamed data in the third domain. The operation 210 may be performed via execution of the forward-reverse transform module 116 in exemplary embodiments. In accordance with exemplary embodiments, since the sum of shifted Gaussian functions at different beam center locations may be a constant, the sum of phase-aligned, parallel Gaussian beams can approximately represent a plane wave.

Figure 3:
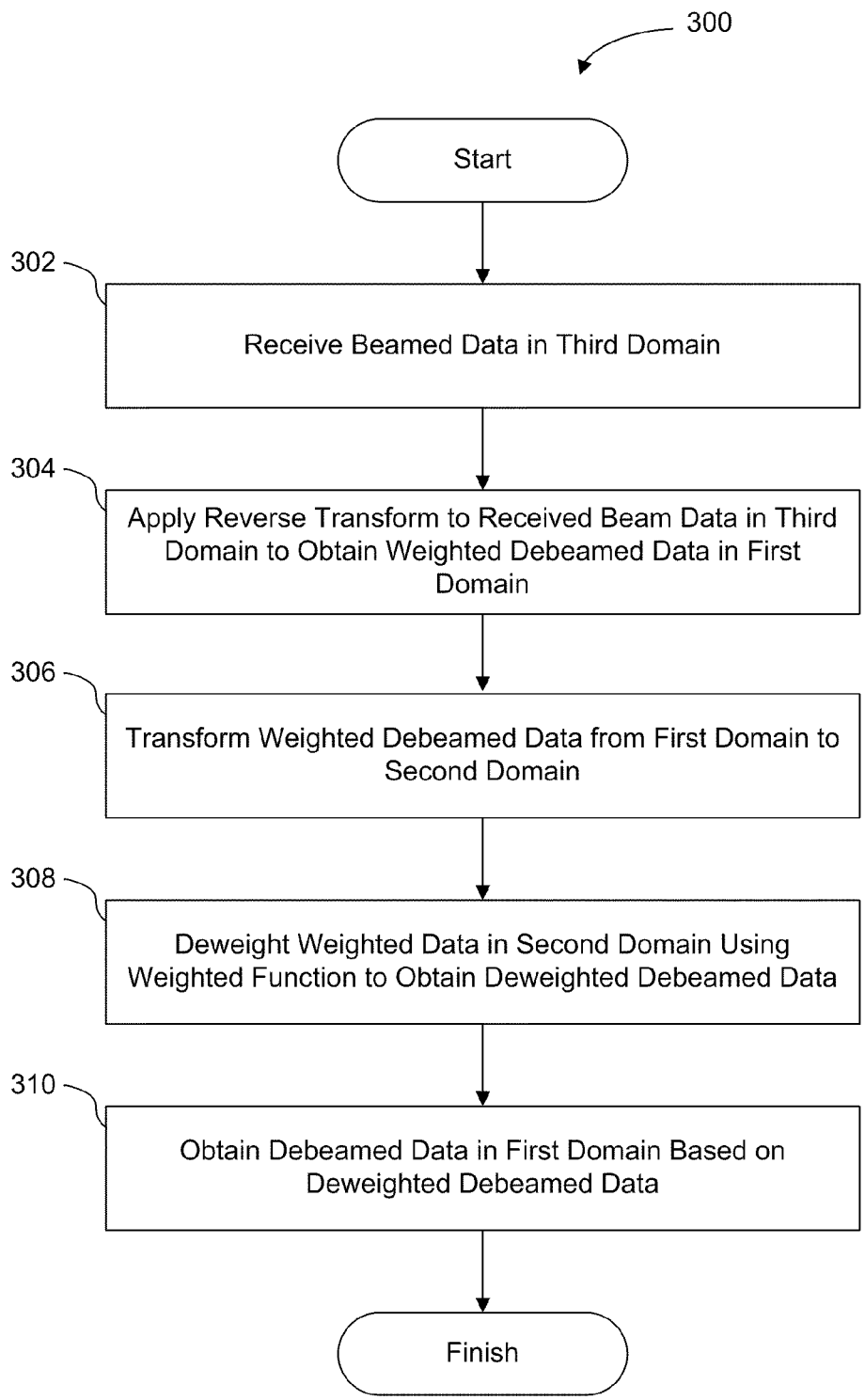
FIG. 3 illustrates a method for obtaining debeamed data from beamed data, in accordance with one or more embodiments of the invention.

FIG. 3 illustrates a method 300 for obtaining debeamed data from beamed data, in accordance with one or more embodiments of the invention. The operations of the method 300 presented below are intended to be illustrative. In some embodiments, the method 300 may be accomplished with one or more additional operations not described, and/or without one or more of the operations discussed. Additionally, the order in which the operations of the method 300 are illustrated in FIG. 3 and described below is not intended to be limiting.

In some embodiments, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 300 in response to instructions stored electronically on an electronic storage medium. The one or more processing devices may include one or more devices configured through hardware, firmware, and/or software to be specifically designed for execution of one or more of the operations of the method 300.

At an operation 302, beamed data is received in the third domain. According to exemplary embodiments, the communications module 110 may be executed to perform the operation 302.

At an operation 304, a reverse transform is applied to the received beamed data in the third domain to obtain weighted debeamed data in the first domain. The operation 304 may be performed through execution of the forward-reverse transform module 116.

At an operation 306, the weighted debeamed data is transformed from the first domain to the second domain. The weighted debeamed data may be transformed from the first domain to the second domain using a fast Fourier transform. The time-frequency transform module 112 may be executed to perform the operation 306 in some embodiments.

At an operation 308, the weighted debeamed data in the second domain is deweighted using a weighting function to obtain deweighted debeamed data. Deweighting the weighted debeamed data may include retrieving weighting coefficients associated with the weighting function. The deweighting may be performed based on individual ones of one or more beam center locations. As mentioned herein, the weighting function may include or be related to a Gaussian function, and/or the weighting function may be related to the square of a distance to one or more beam center locations. The weighting-deweighting module 114 may be executed to perform the operation 308, in accordance with some embodiments.

At an operation 310, debeamed data in the first domain is obtained based on the deweighted debeamed data. The debeamed data may be associated with shot gather data. Obtaining the debeamed data may include computing least-square sense inverse coefficients associated with the deweighted debeamed data. The operation 310 may be performed via execution of the forward-reverse transform module 116. The operation 310 may include transforming the deweighted debeamed data from the second domain to the first domain using an inverse fast Fourier transform, such as in conjunction with execution of the time-frequency transform module 112.

Figure 4:
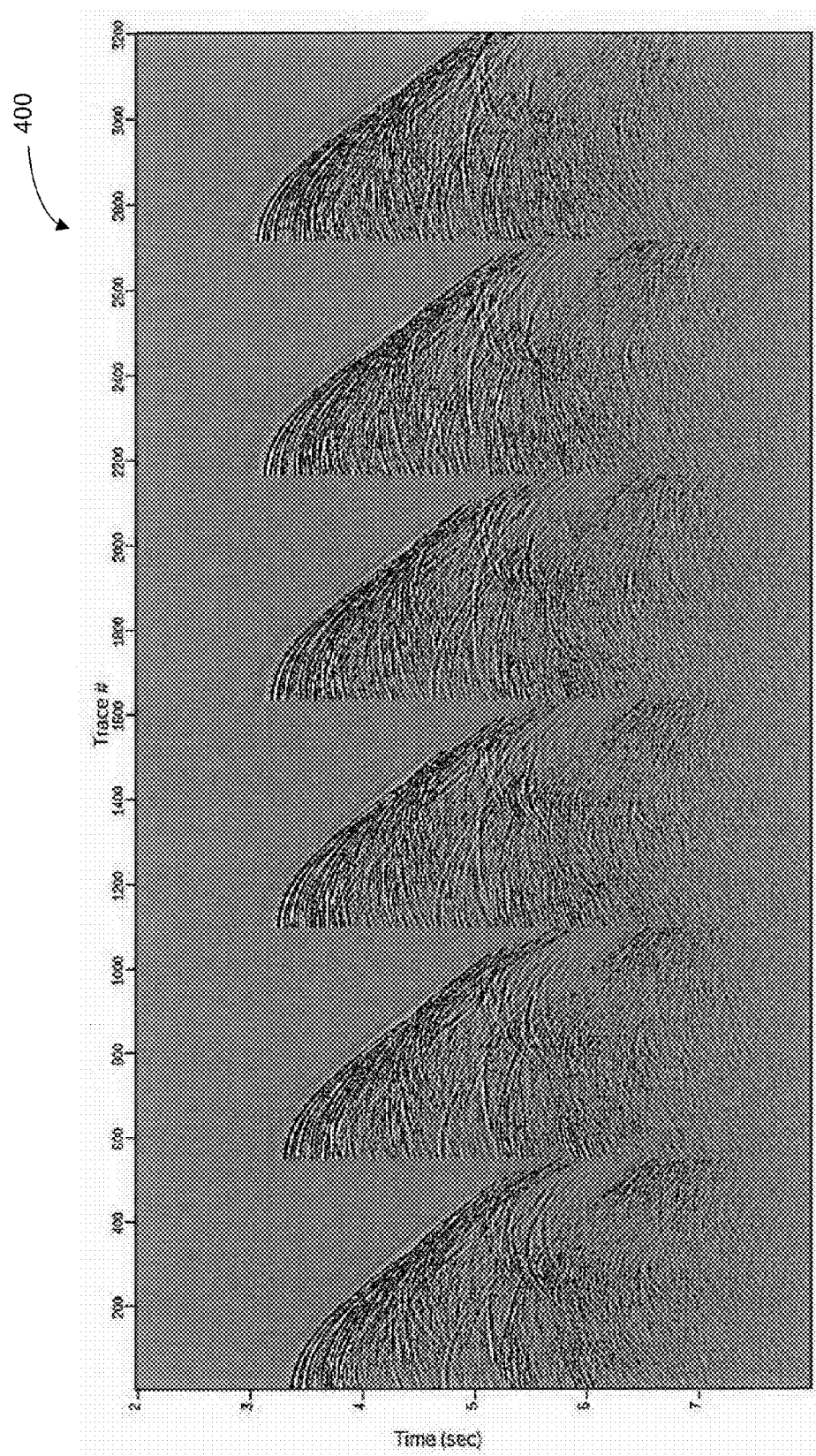
FIG. 4 illustrates a subset of exemplary shot gather data.

FIG. 4 illustrates exemplary shot gather data 400. It is noteworthy that the shot gather data 400 contains some direct wave energy and shallow noise energy. The shot gather data 400 may be received by the communications module 110.

Figure 5:
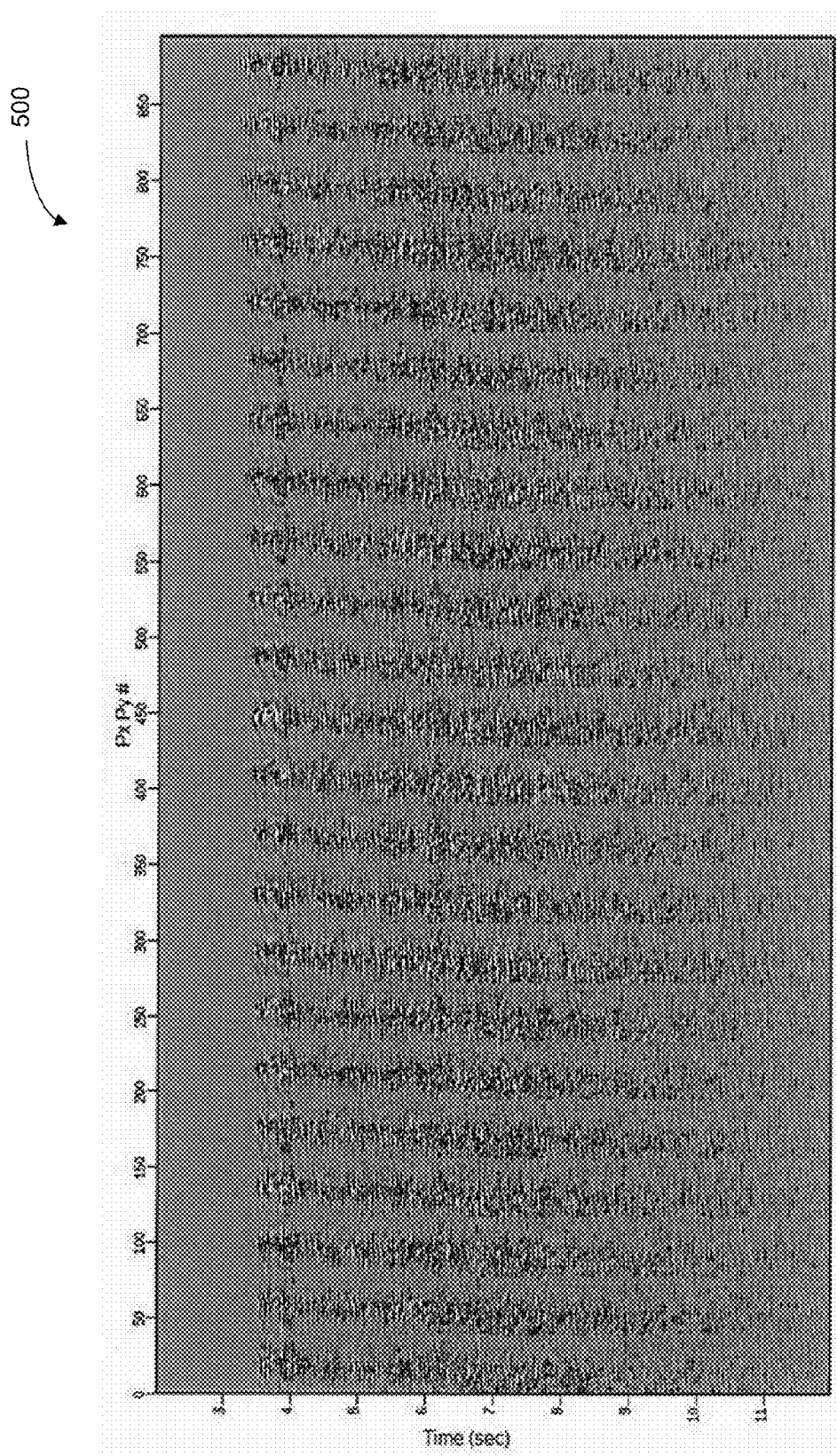
FIG. 5 illustrates exemplary beamed data obtained from the shot gather data of FIG. 4 through embodiments of the present invention.

FIG. 5 illustrates exemplary beamed data 500 obtained from the shot gather data 400 of FIG. 4 through embodiments of the present invention. It is noteworthy that the beamed data 500 shows energy distribution over different Px and Py on the horizontal axis. The beamed data 500 may be obtained by the method 200 described in connection with FIG. 2, in accordance with some implementations.

Figure 6:
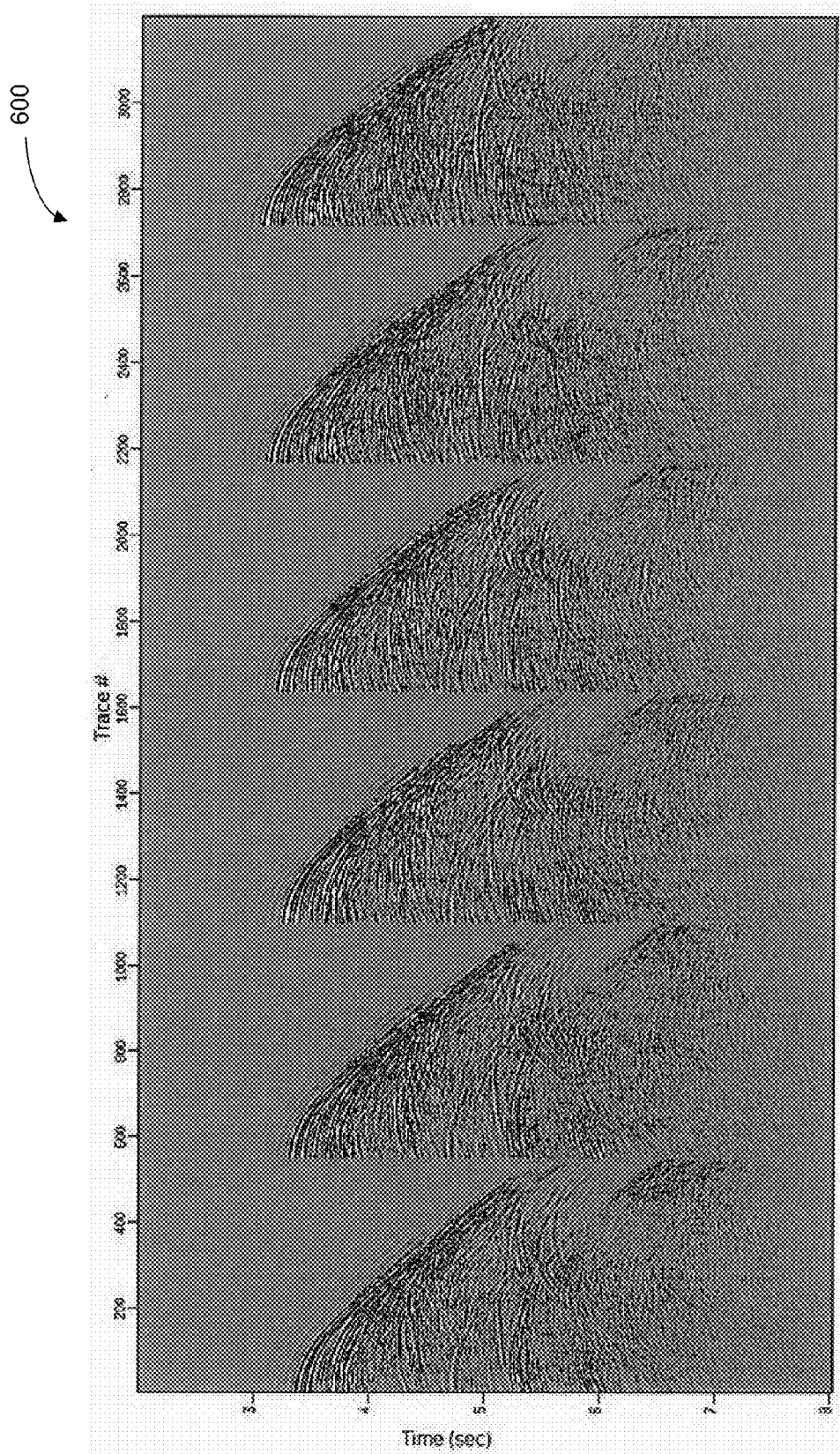
FIG. 6 illustrates exemplary debeamed data obtained from beamed data of FIG. 5 through embodiments of the present invention.

FIG. 6 illustrates exemplary debeamed data 600 obtained from the beamed data 500 of FIG. 5 through embodiments of the present invention. In comparison with the shot gather data 400 of FIG. 4, the debeamed data 600 does not contain direct wave, shallow noise, and some high-Px-Py energies. According to some implementations, the debeamed data 600 may be obtained by the method 300 described in connection with FIG. 3.

Figure 7:
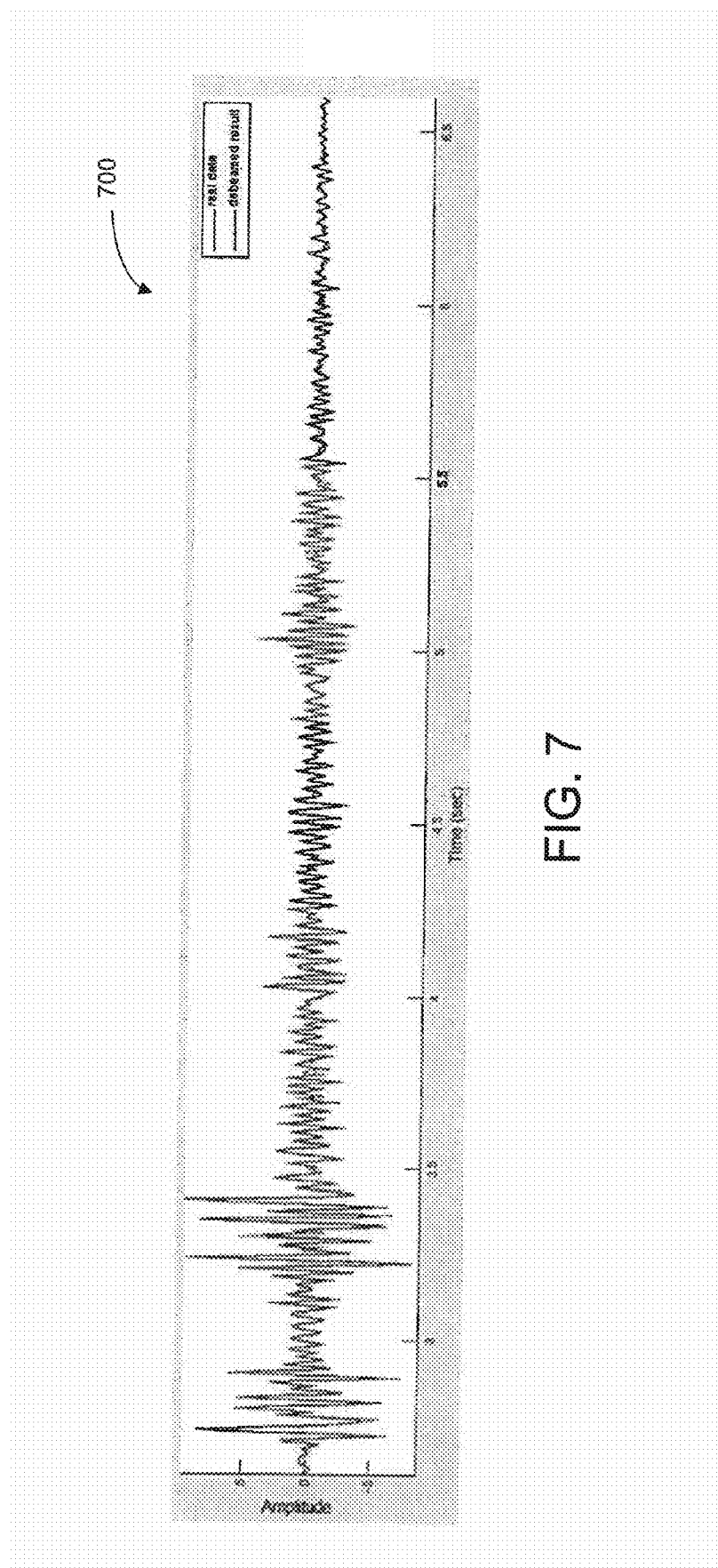
FIG. 7 illustrates a trace waveform comparison of the shot gather data of FIG. 4 and the debeamed data of FIG. 6.

FIG. 7 illustrates a trace waveform 700 comparison of the shot gather data 400 of FIG. 4 and the debeamed data 600 of FIG. 6. As can be determined from the trace waveform 700, the debeamed data 600 is nearly perfectly compatible with the shot gather data 400.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for obtaining beamed data from shot gather data, the method comprising:

receiving shot gather data for a geophysical volume of interest in a first domain, the first domain having at least a first component and a second component, the first component relating to seismic wave propagation time within the geophysical volume of interest, and the second component relating to lateral spacing in the geophysical volume of interest;

transforming the received shot gather data from the first domain to a second domain, the second domain having a frequency component and at least one spatial component, the at least one spatial component of the second domain corresponding to the second component of the first domain;

weighting the shot gather data in the second domain using a weighting function;

transforming the weighted shot gather data from the second domain to the first domain; and applying a forward transform to the weighted shot gather data in the first domain to obtain beamed data in a third domain, the third domain having at least a first component and a second component, the first component relating to local plane wave arrival time at a beam center surface location of the geophysical volume of interest, and the second component relating to plane wave arrival directions.

2. The method of claim 1, wherein the second component of the first domain is associated with one or more detector positions.

3. The method of claim 1, wherein the received shot gather data is transformed from the first domain to the second domain using a fast Fourier transform.

4. The method of claim 1, wherein the weighted shot gather data is transformed from the second domain to the first domain using an inverse fast Fourier transform.

5. The method of claim 1, further comprising binning the received shot gather data in the second component of the first domain.

6. The method of claim 5, wherein the binning is based on one or more beam center locations.

7. The method of claim 1, wherein the weighting is performed based on individual ones of one or more beam center locations.

8. The method of claim 1, wherein the weighting function is related to a Gaussian function.

9. The method of claim 1, wherein the weighting function is related to the square of a distance to one or more beam center locations.

10. A computer-implemented method for obtaining debeamed data from beamed data, the method comprising:

receiving beamed data in a third domain, the third domain having at least a first component and a second component, the first component relating to local plane wave arrival time at a beam center surface location of the geophysical volume of interest, and the second component relating to plane wave arrival directions;

applying a reverse transform to the received beamed data in the third domain to obtain weighted debeamed data in a first domain, the first domain having at least a first component and a second component, the first component relating to seismic wave propagation time within the geophysical volume of interest, and the second component relating to lateral spacing in the geophysical volume of interest;

transforming the weighted debeamed data from the first domain to a second domain, the second domain having a frequency component and at least one spatial component, the at least one spatial component of the second domain corresponding to the second component of the first domain;

deweighting the weighted debeamed data in the second domain using a weighting function to obtain deweighted debeamed data; and obtaining debeamed data in the first domain based on the deweighted debeamed data, the debeamed data associated with shot gather data.

11. The method of claim 10, wherein obtaining the debeamed data includes computing least-square sense inverse coefficients associated with the deweighted debeamed data.

12. The method of claim 10, further comprising retrieving weighting coefficients associated with the weighting function.

13. The method of claim 10, wherein the second component of the first domain is associated with one or more detector positions.

14. The method of claim 10, wherein the weighted debeamed data is transformed from the first domain to the second domain using a fast Fourier transform.

15. The method of claim 10, further comprising transforming the deweighted debeamed data from the second domain to the first domain using an inverse fast Fourier transform.

16. The method of claim 10, wherein the deweighting is performed based on individual ones of one or more beam center locations.

17. The method of claim 10, wherein the weighting function is related to a Gaussian function.

18. The method of claim 10, wherein the weighting function is related to the square of a distance to one or more beam center locations.

19. A system configured to obtain beamed data from shot gather data and debeamed data from beamed data, the system comprising:
    one or more processors configured to execute computer program modules, the computer program modules comprising:
        a communications module configured to receive data including one or more of shot gather data for a geophysical volume of interest in a first domain or beamed data in a third domain, the first domain having at least a first component and a second component, the first component of the first domain relating to seismic wave propagation time within the geophysical volume of interest, the second component of the first domain relating to lateral spacing in the geophysical volume of interest, the third domain having at least a first component and a second component, the first component of the third domain relating to local plane wave arrival time at a beam center surface location of the geophysical volume of interest, and the second component of the third domain relating to plane wave arrival directions;
        a time-frequency transform module configured to transform data between the first domain and a second domain, the second domain having a frequency component and at least one spatial component, the at least one spatial component of the second domain corresponding to the second component of the first domain;
        a weighting-deweighting module configured to perform one or more of weighting data using a weighting function or deweighting data using the weighting function;
        a forward-reverse transform module configured to perform one or more of applying a forward transform to weighted shot gather data in the first domain to obtain beamed data in the third domain or applying a reverse transform to beamed data in the third domain to obtain weighted debeamed data in the first domain.

20. The system of claim 19, wherein the computer program modules further comprise a coefficient module configured to store weighting coefficients associated with the weighting function.

* * * * *